US012685421B2

(12) United States Patent
Yang et al.

(10) Patent No.: US 12,685,421 B2
(45) Date of Patent: Jul. 21, 2026

(54) AUTONOMOUS MOBILE ROBOT

(71) Applicant: ECOVACS ROBOTICS CO., LTD., Suzhou (CN)

(72) Inventors: Keting Yang, Suzhou (CN); Ya Liu, Suzhou (CN); Qingtao Chen, Suzhou (CN); Zeheng Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 379 days.

(21) Appl. No.: 17/769,711

(22) PCT Filed: Oct. 20, 2020

(86) PCT No.: PCT/CN2020/122184
§ 371 (c)(1),
(2) Date: Apr. 15, 2022

(87) PCT Pub. No.: WO2021/078118
PCT Pub. Date: Apr. 29, 2021

(65) Prior Publication Data
US 2022/0369887 A1 Nov. 24, 2022

(30) Foreign Application Priority Data

Oct. 25, 2019 (CN) .......................... 201911026299.7

(51) Int. Cl.
*A47L 11/24* (2006.01)
*A47L 11/40* (2006.01)
*G05D 1/00* (2006.01)

(52) U.S. Cl.
CPC ........... *A47L 11/4061* (2013.01); *A47L 11/24* (2013.01); *A47L 11/40* (2013.01); *A47L 11/4011* (2013.01);
(Continued)

(58) Field of Classification Search
CPC ... A47L 11/24; A47L 11/4061; A47L 2201/04
See application file for complete search history.

(56) References Cited

U.S. PATENT DOCUMENTS 8,950,792 B2 * 2/2015 Hickey ................ B25J 19/0091
293/4
9,144,355 B2 9/2015 Jang et al.
(Continued)

FOREIGN PATENT DOCUMENTS

CN 107336267 A 11/2017
CN 206967493 U 2/2018
(Continued)

OTHER PUBLICATIONS

European Search Report dated Apr. 13, 2023 as received in application No. 20879096.4.
(Continued)

*Primary Examiner* — Erika J. Villaluna
(74) *Attorney, Agent, or Firm* — Maschoff Brennan

(57) ABSTRACT

Provided is an autonomous mobile robot, includes a cover, a base and a pressure sensor assembly; the cover includes a top plate and a side plate that are integrally arranged, a connecting portion is formed between the top plate and the side plate, and the connecting portion is at least partially higher than the top plate; the base is arranged below the top plate; and the pressure sensor assembly is arranged in a manner of facing the side plate. The impact of the traditional autonomous mobile robot using a floating bump plate on the positioning accuracy of an optical component may be avoided and the reliability of the autonomous mobile robot during the movement is improved.

19 Claims, 8 Drawing Sheets

(52) U.S. Cl.
CPC ........ *G05D 1/0227* (2013.01); *A47L 2201/04*
(2013.01)

(56) References Cited

U.S. PATENT DOCUMENTS

| | | | |
|---|---|---|---|
| 9,622,635 B2 | 4/2017 | Jones et al. | |
| 2004/0143930 A1* | 7/2004 | Haegermarck | ...... G05D 1/0227 |
| | | | 15/358 |
| 2012/0180251 A1 | 7/2012 | Jang et al. | |
| 2013/0241217 A1 | 9/2013 | Hickey et al. | |
| 2017/0332857 A1* | 11/2017 | Nam | .................... G05D 1/0248 |
| 2018/0078106 A1* | 3/2018 | Scholten | ................. A47L 9/009 |

FOREIGN PATENT DOCUMENTS

| | | | |
|---|---|---|---|
| CN | 108784520 A | 11/2018 |
| CN | 208942016 U | 6/2019 |
| CN | 110123207 A | 8/2019 |
| CN | 209186582 U | 8/2019 |
| CN | 110226898 A | 9/2019 |
| CN | 110269547 A | 9/2019 |
| CN | 211381116 U | 9/2020 |
| EP | 3 007 023 A1 | 4/2016 |
| JP | H11178764 A | 7/1999 |
| KR | 20060085772 A | 7/2006 |
| WO | 2014/190919 A1 | 12/2014 |

OTHER PUBLICATIONS

EP Office Action dated Feb. 2, 2024 as received in Application No. 20879096.4.
CN Office Action dated Dec. 31, 2024 as received in Application No. 201911026299.7.
Chinese Office Action dated Jun. 27, 2025 as received in application No. 201911026299.7.
Korean Office Action dated Nov. 4, 2025 as received in application No. 201911026299.7.
CN Office Action dated Nov. 4, 2025 as received in application No. 201911026299.7.

* cited by examiner

30

320

310

330

AUTONOMOUS MOBILE ROBOT

FIELD

The present disclosure relates to the technical field of robots, in particular to an autonomous mobile robot.

BACKGROUND

With the advancement of science and technology and the improvement of quality of life, sweeping autonomous mobile robots have entered more and more people's lives.

At present, most of obstacle avoidance devices of the sweeping autonomous mobile robots on the market are floating bump plates. This floating bump plate structure is located at the front end of the machine in a forward moving direction, and the front end of the machine generally needs to be equipped with an optical component having a high precision requirement, that is, the optical element is provided on the floating bump plate. The movable characteristic of the floating bump plate will inevitably reduce the positioning accuracy of the optical component, thereby affecting the reliability of the autonomous mobile robot during the movement.

SUMMARY

In view of this, an embodiment of the present disclosure provides an autonomous mobile robot, including a cover, a base, and a pressure sensor assembly;

the cover includes a top plate and a side plate, the top plate and the side plate are integrally arranged, a connecting portion is formed between the top plate and the side plate, and the connecting portion is at least partially higher than the top plate;

the base is arranged below the top plate; and the pressure sensor assembly is disposed toward the side plate.

Further, the connecting portion is of an inverted V-shaped structure.

Further, the side plate is made of rigid plastic.

Further, a first gap is reserved between an end part of the side plate close to the base and an outer edge of the base.

Further, the base is provided with a groove, a lower end of the side plate is inserted into the groove; and a second gap is reserved between an inner wall of the groove and a lower end of the side plate.

Further, a thickness of the connecting portion is 1 mm to 2 mm.

Further, a thickness of the side plate is 1 mm to 2 mm.

Further, the pressure sensor assembly includes a sensor support layer and a sensor body layer being attached to each other.

Further, the sensor support layer is made of a rigid material.

Further, the autonomous mobile robot further includes a first fixed frame; the first fixed frame is arranged on the top plate; the pressure sensor assembly is arranged between the side plate and the first fixed frame; an end part of the first fixed frame close to the side plate abuts against the sensor support layer; and the end part of the first fixed frame away from the side plate has a first preset distance from the side plate.

Further, a minimum value of the first preset distance is 5 mm.

Further, the first preset distance is 14 mm to 17 mm.

Further, the pressure sensor assembly includes at least one strain pressure sensor;

each of the strain pressure sensors includes a sensor seat and a sensor body; the sensor seat is arranged on the side of the top plate facing the base; the sensor body is arranged on the sensor seat; and a sensing surface of the sensor body faces the side plate.

Further, a number of the strain pressure sensors is not less than two; and an included angle between two adjacent strain pressure sensors is not more than 45 degrees.

Further, each of the strain pressure sensors further includes a sensor cover; the sensor cover is connected to the sensor seat and moves relative to the sensor seat; a side of the sensor cover facing away from the sensor seat faces the side plate; and a side of the sensor cover facing the sensor seat is provided with a first sensing protrusion opposite to the sensor body.

Further, a side of the side plate facing the sensing surface of the sensor body is provided with a second sensing protrusion opposite to the sensor body.

Further, the autonomous mobile robot further includes a second fixed frame; the second fixed frame is arranged on a side of the top plate facing the base; the sensor seat is arranged on a side of the second fixed frame facing the side plate; and the sensor body has a second preset distance from the side plate.

Further, the second preset distance is 15.5 mm to 17.5 mm.

Further, the sensor cover on both sides of the first sensing protrusion is provided with a connecting rod facing the sensor seat; an end part of the connecting rod is provided with a hook; and a position of the sensor seat opposite to the connecting rod is provided with a connecting slot for the connecting rod to pass through.

An embodiment of the present disclosure further provides an autonomous mobile robot, including a cover, a base, and a pressure sensor assembly;

the cover includes a top plate and a side plate, the top plate and the side plate are integrally arranged, a connecting portion is formed between the top plate and the side plate, and the connecting portion is at least partially higher than the top plate;

the base is arranged below the top plate; and the pressure sensor assembly is disposed toward the side plate, and a preset distance between a fixed frame of the pressure sensor assembly and the side plate is greater than 5 mm.

An embodiment of the present disclosure further provides an autonomous mobile robot, including a housing and a pressure sensor assembly;

the housing includes a base plate and a side plate that are integrally arranged; a connecting portion is formed between the base plate and the side plate; an angle formed by the connecting portion is an acute angle; and a sensing surface of the pressure sensor assembly faces the side plate.

Further, the value of the acute angle is less than 30 degrees.

The autonomous mobile robot provided by the embodiments of the present disclosure includes a cover, a base, and a pressure sensor assembly. A connecting portion is formed between the top plate and the side plate of the cover. The connecting portion is at least partially higher than the top plate, and a sensing surface of the pressure sensor assembly faces to the side plate, so as to avoid the impact of the traditional autonomous mobile robot using a floating bump plate on the positioning accuracy of an optical component and to improve the reliability of the autonomous mobile robot during the movement.

BRIEF DESCRIPTION OF THE DRAWINGS

The accompanying drawings described here are used to provide a further understanding of the present application and form a part of the present application. The schematic embodiments and descriptions of the present application are used to explain the present disclosure and do not constitute an improper limitation on the present application. In the drawings.

DETAILED DESCRIPTION OF EXAMPLE EMBODIMENTS

Figure 1:
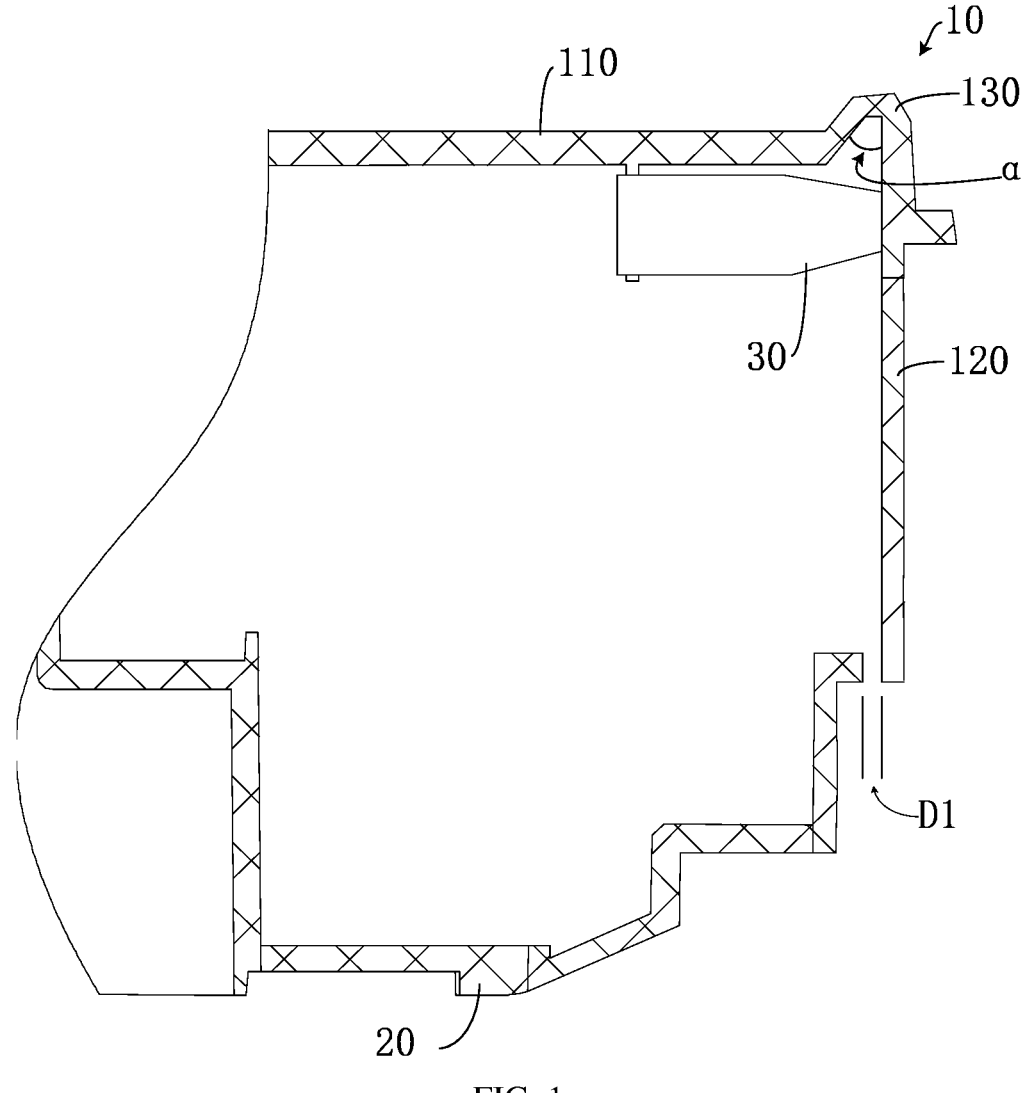
FIG. 1 is a schematic diagram of a partial structural section of an autonomous mobile robot provided in an embodiment of the present disclosure.

The implementation of the present disclosure will be described in detail with the drawings and embodiments, so as to fully understand and implement an implementation process of how the present disclosure applies technical means to solve technical problems and achieve technical effects.

For example, certain words are used in the specification and the claims to refer to specific assemblies. Those skilled in the art should understand that hardware manufacturers may use different names to refer to the same assembly. This specification and claims do not use differences in names as a way to distinguish assemblies, but use differences in functions of assemblies as a criterion for distinguishing. If "including" mentioned in the entire specification and claims is an open term, it should be interpreted as "including but not limited to". "Approximately" means that within an acceptable error range, those skilled in the art can solve the technical problem within a certain error range and basically achieve the technical effect. In addition, the term "coupled" or "electrically connected" includes any means of direct and indirect electrical coupling. Therefore, if a first device is described as being coupled to a second device, it means that the first device can be directly electrically coupled to the second device, or indirectly electrically coupled to the second device through other devices or coupling means. The following description of the specification is a preferred implementation mode for implementing the present disclosure. The description is based on the general principle for illustrating the present disclosure and is not intended to limit the scope of the present disclosure. The protection scope of the present disclosure shall be subject to those defined by the appended claims.

It is worthwhile to note that the terms "comprise", "include", or any other variation thereof are intended to cover a non-exclusive inclusion, so that a process, a method, an article, or a device that includes a list of elements includes those elements and further includes other elements not expressly listed or inherent to such a process, method, article, or system. Without more constraints, an element preceded by "includes a . . . " does not preclude the existence of additional identical elements in the process, method, product, or system that includes the element.

At present, all autonomous mobile robots on the market have an obstacle avoidance structure. A sweeping autonomous mobile robot is taken as an example. Generally, a floating or mobile bump plate is arranged at a front end of the machine in a forward movement direction, and a sensor, such as a travel switch, is arranged between the bump plate and the machine body. The bump plate can move relative to the machine body. When the bump plate meets an obstacle, it is collided and moves in an opposite direction of the forward movement direction and then contacts its internal sensor, thereby triggering the sensor to generate an electrical signal. The sensor transmits this electrical signal to a Micro Control Unit (MCU) of the machine; and the MCU of the machine controls, according to the electrical signal, a moving device to move and adjust to complete obstacle avoidance. However, with the advancement of science and technology, most autonomous mobile robots have added an Artificial Intelligence (AI) function and/or a Time-of-flight (TOF) function; at this time, an optical component with a higher accuracy requirement needs to be fixed in front of the machine body; and this floating bump plate cannot provide a higher positioning reference for these optical components, thus affecting the reliability of the autonomous mobile robot in the forward movement process. In addition. Since the floating bump plate generates a displacement relative to the machine body after touching an obstacle. Furthermore, for the autonomous mobile robot with this floating bump plate, the appearance of the entire machine is affected by the structure of the floating bump plate, so that the style of a product is single and limited; lines are not fine enough; and the product quality needs to be improved. In addition, the existing autonomous mobile robot also adopts a gyroscope/acceleration sensor to achieve a fixed bump plate. However, when the acceleration of the machine body changes, a bump signal will be generated to determine by mistake that the machine collides with an obstacle and the reliability of obstacle avoidance is lower.

In view of the above technical problems, the present disclosure provides an autonomous mobile robot. Referring to FIG. 1, a schematic diagram of a partial structural section of an autonomous mobile robot provided in an embodiment of the present disclosure. The autonomous mobile robot includes a cover 10, a base 20, and a pressure sensor assembly 30.

The cover 10 includes a top plate 110 and a side plate 120 that are integrally arranged; the side plate 120 is connected to a surface of the top plate 110 facing the base 20; a connecting portion 130 is formed between the top plate 110 and the side plate 120, that is, the connecting portion 130 is formed in a joint between the top plate 110 and the side plate 120; the connecting portion 130 is at least partially higher than the top plate 110. It should be noted here that the connecting portion 130 is not an ordinary corner because ordinary corners are generally flush with or within two sides a corner, and are not partially higher than one side of the corner. Specifically, the connecting portion 130 may be in various shapes such as a zigzag shape, a sawtooth shape, or a wave shape. The integral arrangement here refers to an integrated structure of the top plate 110 and the side plate 120. That is, the top plate 110 and the side plate 120 are connected to each other to form the cover 10. The cover 10 may be integrally molded by, for example, an injection molding process, or may be prepared by, for example, a welding process. The top plate 110 is a top shell of the machine. The side plate 120 is a side edge connected to an edge of the top plate 110 and extending towards the base 20. The side plate 120 here may be arranged around the top plate 110, or along a part of the top plate 110, such as along a front end in a forward movement machine. It should be pointed out here that one end of the side plate 120 is connected to the top plate 110, and the other end extends toward the base 20, but is not connected and fixed with the base 20, which is a free end that can move relative to the base 20. For example, when the autonomous mobile robot moves, an obstacle on the way of moving is in contact with the side plate 120 and squeezes the side plate 120, thereby causing the side plate 120 to deform toward the inside of the machine body. The cover 10 is analyzed strictly through Computer Aided Engineering (CAE). Particularly, the connecting portion 130 between the side plate 120 and the top plate 110 needs to be analyzed strictly through the. In order to improve the strength of the cover 10, a reinforcing rib is also arranged inside the cover 10, for example, the reinforcing rib is arranged on a surface of the top plate 110 facing the base 20, and the reinforcing rib is arranged on a surface of the side plate 120 facing the inside of the machine body.

The base 20 is disposed below the top plate 110 and is connected to the top plate 110. The base 20 may be fixedly connected to the top plate 110 inside the machine body by a screw, or the top plate 110 and the base 20 are connected and fixed by means of a snap. The base 20, the top plate 110 and the side plate 120 form a shell structure of the autonomous mobile robot. The side plate 120 is located at the front end of the shell structure of the autonomous mobile robot in the forward movement direction.

The pressure sensor assembly 30 is arranged in the machine body, for example, inside or on the inner side of a connecting structure formed by the side plate 120 and the top plate 110. It is to be emphasized here is the sensing surface of the pressure sensor assembly 30 faces the side plate 120. Specifically, in one implementation mode of the embodiment of the present disclosure, the pressure sensor assembly 30 is fixedly connected to the top plate 110, and the sensing surface of the pressure sensor assembly 30 is located below the connecting portion 130 and is opposite to the side plate 120. Connection methods for the pressure sensor assembly 30 in the cover 10 include, but are not limited to, bonding, welding, screw connection, and the like.

In the autonomous mobile robot provided in the embodiment of the present disclosure, by arranging a part of the connecting portion 130 above the top plate 110, that is, causing the connecting portion 130 to face an included angle in an internal direction of the machine body, which is referred to as an internal angle α, the internal angle α is less than 90 degrees to ensure: when the height of the obstacle is relatively large, for example, when the obstacle directly contacts the upper side of the side plate 120, that is, when the obstacle directly contacts the connecting portion 130, the side plate 120 may tend to move towards the inside of the machine body. For example, when an obstacle that is as high as the top plate 110 collides with the side plate 120, the side plate 120 can move toward the inside of the machine body. That is, when the internal angle α is set to be an acute angle, it is more favorable for the side plate 120 to move toward the inside of the machine body. Specifically, the value of the acute angle is less than 30 degrees.

When in use, if the autonomous mobile robot encounters an obstacle during its movement, the side plate 120 or the connecting portion 130 will first contact the obstacle, and directly squeeze the side plate 120 to cause the side plate to deform toward the inside of the obstacle, or the connecting portion 130 is squeezed. Due to the specific structure of the connecting portion 130, the side plate 120 has a movement towards the inside of the machine body, that is, the side plate 120 is indirectly caused to deform toward the inside of the machine body. The deformed side plate 120 contacts the sensing surface of the pressure sensor assembly 30, and squeezes the pressure sensor assembly 30, so that the pressure sensor assembly 30 generates an impact signal, and the impact signal is transmitted to a host MCU of the autonomous mobile robot to control the moving device of the autonomous mobile robot to execute the obstacle avoidance operation instruction and move, so as to complete obstacle avoidance.

Further, in other preferred embodiments of the present disclosure, in order to ensure that when a higher obstacle collides with the top position, i.e., the connecting portion 130, of the side plate 120, the side plate 120 has a movement towards the inside of the machine body in a horizontal direction of the movement of the machine, that is, the side plate 120 is deformed towards the inside of the machine body, it is necessary to design a connection, i.e., the connecting portion 130, between the side plate 120 and the top plate 110 to be of an inverted V-shaped structure.

In addition, if the value of the internal angle α s ensured to be less than 90 degrees, it can be ensured that when the higher obstacle collides with the top position of the side plate 120, the side plate 120 has a movement towards the inside of the machine body in the horizontal direction. However, its specific size needs to be based on a molding method for the cover 10. In principle, if the value of the internal angle α is smaller, a horizontal movement amount distributed by the pressure sensor assembly 30 inside is larger, that is, the detection sensitivity of the pressure sensor assembly 30 is higher. Generally, if the cover 10 is formed by machining, the value of the internal angle α can be less than 10 degrees; and if the cover 10 is formed by injection molding the value of the internal angle α is generally greater than 15 degrees.

According to one embodiment of the present disclosure, the side plate 120 is made of rigid plastic. The rigid plastic here includes, but is not limited to, Acrylonitrile Butadiene Styrene (ABS, which is a terpolymer of three monomers: acrylonitrile (A), butadiene (B) and styrene(S)) plastic, such as Polyvinyl Chloride (PVC) plastic. The side plate 120 is made of the rigid plastic, so that when the side plate 120 contacts the obstacle, a collision force is quickly transmitted to the pressure sensor assembly 30 to enable the pressure sensor assembly 30 to achieve obstacle sensing, thus improving the obstacle avoidance sensitivity of the autonomous mobile robot.

In addition, in order to ensure that when the side plate 120 and the connecting portion 130 undergo obstacle collision, the side plate 120 is deformed toward the inside of the machine body, so as to trigger the pressure sensor assembly 30 to perform obstacle avoidance detection. The thickness of the side plate 120 and the thickness of the connecting portion 130 should not be too large. Generally, the thickness of the connecting portion 130 and/or the side plate 120 is controlled between 1 mm and 2 mm. In a preferred embodiment, the thickness of the connecting portion 130 and/or the side plate 120 is 1.5 mm.

Furthermore, in order to ensure that the side plate 120 has a movement towards the inside of the machine body when it collides with an obstacle, so as to trigger the pressure sensor assembly 30 to perform the obstacle avoidance detection, a first gap D1 is reserved between an end part of the side plate 120 close to the base 20 and an outer edge of the base 20.

Specifically, the end part, i.e. the free end, of the side plate 120 close to the base 20, can move when the side plate 120 and the obstacle collide with each other, so that the side plate 120 has a movement towards the inside of the machine body to trigger the pressure sensor assembly 30 to perform the obstacle avoidance detection. A specific measure of this embodiment is as follows: it is designed that the first gap D1 is reserved between the free end and the outer edge of the base 20. In a preferred embodiment, the outer edge of the base 20 is further provided with a baffle plate extending towards the top plate 110, and the first gap D1 is reserved between the end part, i.e. the free end, of the side plate 120 close to the base 20 and the baffle plate. There is no specific limitation to the specific size of the first gap D1, and the specific size can be set according to the sensitivity of the pressure sensor assembly 30 and a deformation coefficient of the cover 10.

Figure 2:
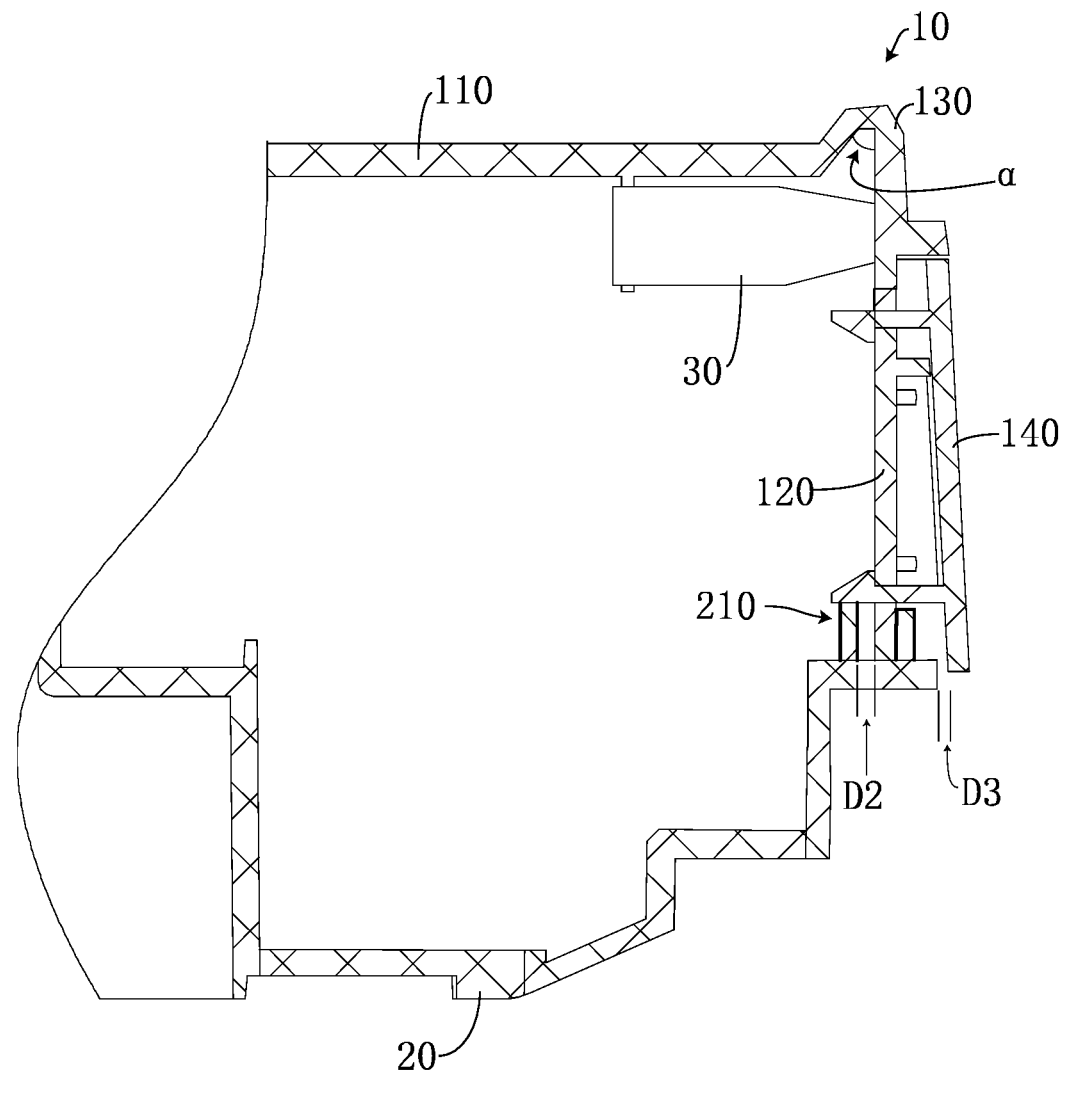
FIG. 2 is a schematic diagram of another partial structural section of an autonomous mobile robot provided in an embodiment of the present disclosure.

Much further, referring to FIG. 2, in order to limit the movement of the free end and avoid damage to the inside of the machine body caused by the excessive movement of the free end when the collision force is too high, a groove 210 is provided in the base 20; a lower end of the side plate 120 is inserted into the groove 210; and there is a second gap D2 between an inner wall of the groove 210 and the lower end of the side plate 120.

Specifically, the groove 210 is composed of two baffle plates arranged on a surface of the base 20 facing the top plate 110, and the end part, i.e. the free end, of the side plate 120 close to the base 20 is located between the two baffle plates. The second gap D2 is reserved between the free end and the baffle plate close to the inside the machine body.

In addition, in other preferred embodiments of the present disclosure, a viewing window 140 is provided on a side of the side plate 120 facing away from the inside of the machine body.

Specifically, the viewing window 140 is generally arranged at the foremost end of the forward movement direction of the autonomous mobile robot, that is, arranged on the outer side of the side plate 120. The inside of the viewing window 140 may be provided with, but not limited to, a positioning module, an infrared emitter, a ranging device, and the like which are used for precisely positioning the autonomous mobile robot. The viewing window 140 has a light-transmitting property so that the optical device inside it can emit visible light rays to the outside.

Connection methods for the viewing window 140 and the side plate 120 includes, but are not limited to, bonding, bolt connection, etc. In a preferred embodiment, a surface of the viewing window 140 facing the side plate 120 is provided with a snap. The side plate 120 is provided with a snap slot, and the viewing window 140 and the side plate 120 are in movable snap-connection through the snap slot and the snap, so as to facilitate quick mounting and maintenance operations for the optical device.

In addition, for the arrangement position of the viewing window 140 on the side plate 120, according to one implementation manner of the present disclosure, the size of the viewing window 140 is less than the size of the side plate 120, and the viewing window 140 is arranged in a middle position area of the side plate 120. At this time, the distance D1 is reserved between the end part, i.e. the free end, of the side plate 120 close to the base 20 and the outer edge of the base 20, or the lower end of the side plate 120 is inserted into the groove 210, and the second gap D2 is reserved between the inner wall of the groove 210 and the lower end of the side plate 120. Generally, the first gap D1 is equal to the second gap D2. According to another implementation manner, the lower end of the viewing window 140 is located below the lower end of the side plate 120, as shown in FIG. 2; at this time, a third gap D3 is reserved between the end part of the viewing window 140 close to the base 20 and the outer edge of the base 20. The end part of the viewing window 140 close to the base 20 is a free end. By means of designing the third gap D3 between the free end and the base 20, it can be ensured that the side plate 120 and/or the viewing window 140 has a movement towards the inside of the machine body when it collides with the obstacle, so as to trigger the pressure sensor assembly 30 to perform corresponding obstacle avoidance detection.

Figure 3:
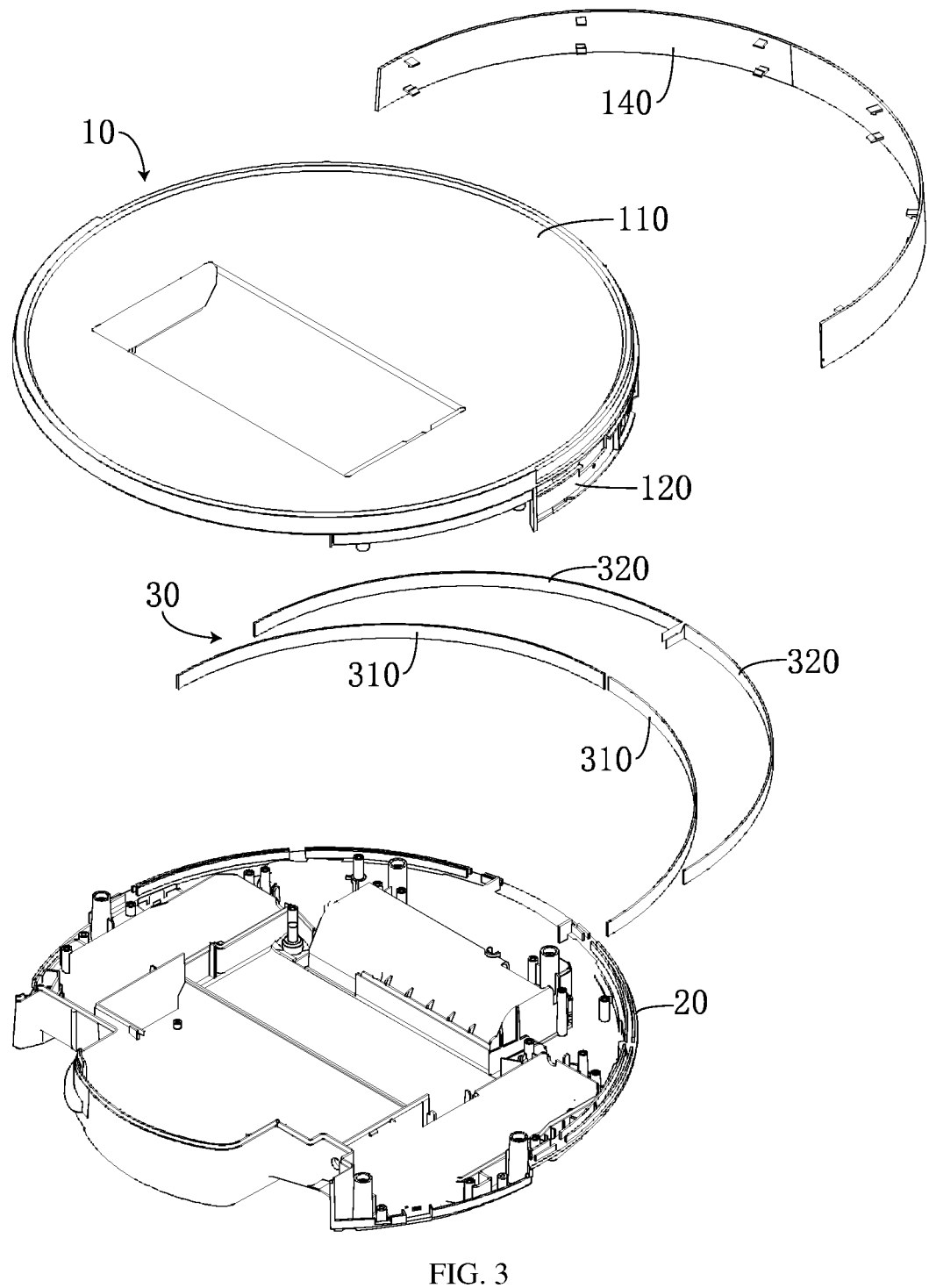
FIG. 3 is a schematic exploded diagram of a three-dimensional structure of an autonomous mobile robot provided in an embodiment of the present disclosure.
Figure 4:
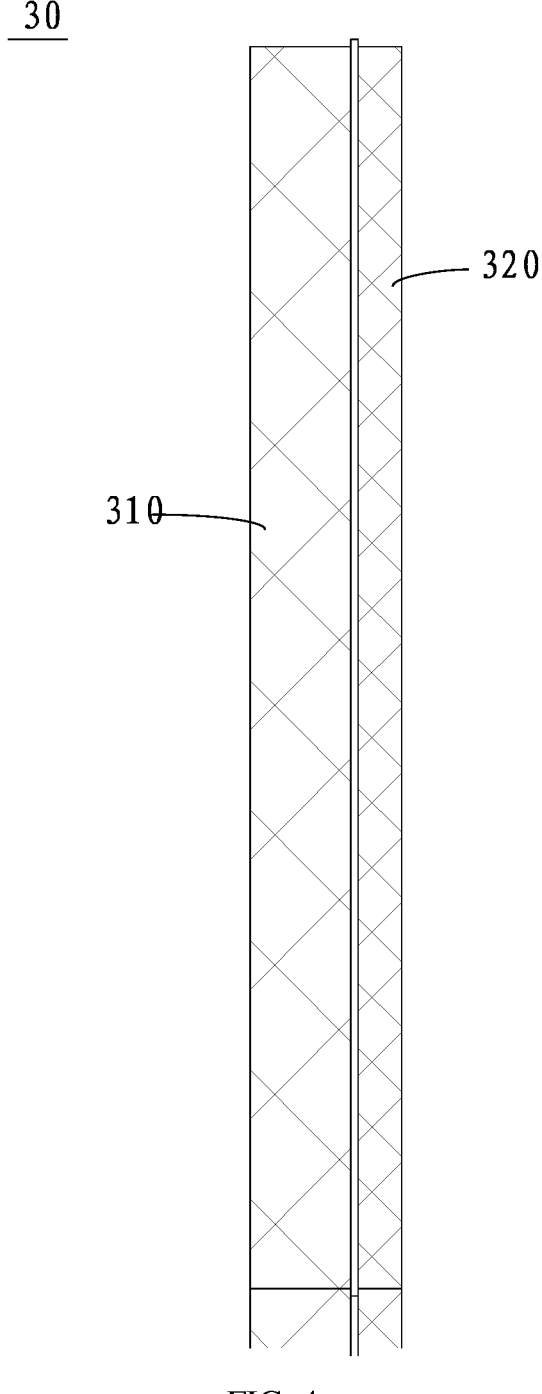
FIG. 4 is a schematic diagram of a sectional structure of a capacitive pressure sensor and a support body thereof of an autonomous mobile robot provided in an embodiment of the present disclosure.
Figure 5:
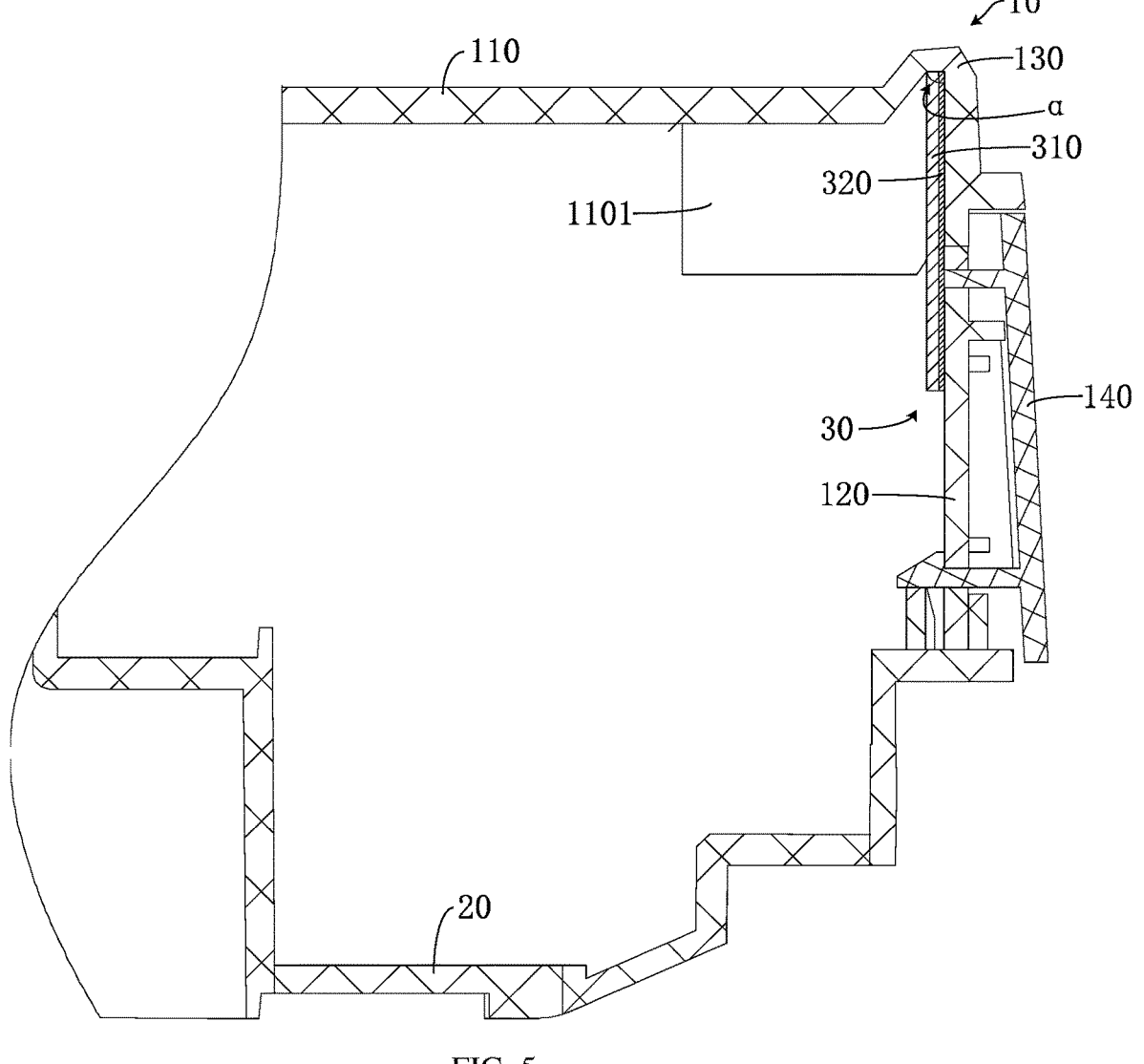
FIG. 5 is a schematic diagram of another partial structural section of an autonomous mobile robot provided in an embodiment of the present disclosure.

Referring to FIG. 3 to FIG. 5, in one embodiment of the present disclosure, the pressure sensor assembly 30 includes a sensor support layer 310 and a sensor body layer 320; the sensor support layer 310 and the sensor body layer 320 are attached to each other; the sensor support layer 310 is arranged on the side of the top plate 110 facing the base 20; the sensor body layer 320 is arranged on the sensor support layer 310; and a sensing surface of the sensor body layer 320 faces the side plate 120.

Specifically, a sensor in the pressure sensor assembly 30 is the sensor body layer 320, and includes, but is not limited to, a capacitive pressure sensor. For example, the sensor body layer 320 is formed by sandwiching a layer of elastomer between two electrode sheets. When a distance between the two electrode sheets changes after the sensor body layer 320 is subjected to a force, a capacitance value of the sensor body layer 320 changes accordingly. The sensor body layer 320 converts the changed capacitance value into an Analog-to-Digital Converter (ADC) signal through an algorithm and sends the ADC signal to the host MCU of the autonomous mobile robot; the sensor body layer 320 is arranged on the sensor support layer 310, and the sensor support layer 310 is made of a rigid material. The sensor support layer 310 made of this rigid material has higher hardness and is not easy to deform by a force, so that the deformation of the sensor body layer 320 due to the buffering on the pressure of the sensor body layer 320 may be avoided, and the detection sensitivity of the sensor body layer 320 is improved. When the side plate 120 has a movement towards the inside of the machine body, the sensor body layer 320 is squeezed, and then the elastomer between the two electrode sheets in the sensor body layer 320 is squeezed, so that the distance between the two electrode sheets changes, and the capacitance value changes. As a result, the sensor body layer 320 converts the changed capacitance value into the ADC signal through an algorithm and sends the ADC signal to the host MCU of the autonomous mobile robot.

Further, the autonomous mobile robot further includes a first fixed frame 1101; the first fixed frame 1101 is arranged on the top plate 110; the pressure sensor assembly 30 is arranged between the side plate 120 and the first fixed frame 1101; an end part of the first fixed frame 1101 close to the side plate 120 abuts against the sensor support layer 310; and a first preset distance is reserved between an end part of the first fixed frame 1101 away from the side plate 120 and the side plate 120.

Specifically, the side of the top plate 110 facing the base 20 is provided with the first fixed frame 1101, and the pressure sensor assembly 30 is sandwiched between the side plate 120 and the first fixed frame 1101, so that the end part of the first fixed frame 1101 close to the side plate 120 abuts against the sensor support layer 310; the sensor body layer 320 is located between the sensor support layer 310 and the side plate 120 to achieve a stacking tendency of the first fixed frame 1101, the sensor support layer 310 and the sensor body layer 320, so that the sensing surface of the sensor body layer 320 faces the side plate 120 to ensure that the sensor body layer 320 can well receive a pressure of the deformation of the side plate 120 to the inside of the machine body, so as to complete the sensing for the obstacle in front of the side plate 120 by the sensor body layer 320. The first preset distance refers to a distance between the end part of the first fixed frame 1101 away from the side plate 120 and the side plate 120, that is, the first preset distance here is a sum of the size of the first fixed frame 1101 in the deformation of the side plate 120 towards the inside of the machine body and the thickness of the pressure sensor assembly 30.

Regarding the size of the first preset distance, in order to prevent the first preset distance from being too small, that is, to prevent the size of the first fixed frame 1101 in the deformation direction of the side plate 120 toward the inside of the machine body from being too small, the first fixed frame 1101 is forced to deform towards the inside of the machine body together with the pressure sensor assembly 30, so that the pressure sensor assembly 30 cannot be squeezed to deform, thereby making the obstacle avoidance detection fail. Generally, the minimum value of the first preset distance is limited to 5 mm.

Further, the size of the first preset distance should not be too large. Considering the requirements for the internal space of the machine body and the miniaturization of products, in other preferred embodiments of the present disclosure, the first preset distance is 14-17 mm.

It should also be pointed out that the number of the sensor support layer 310 and the sensor body layer 320 in the pressure sensor assembly 30 can be determined according to the length of the side plate 120 and the size of the sensor. When there are more than one sensor support layer 310 and more than one sensor body layer 320, the sensor support layers 310 are arranged in sequence along the length of the side plate 120, and the sensor body layers 320 are correspondingly disposed on all the sensor support layers 310.

Figure 6:
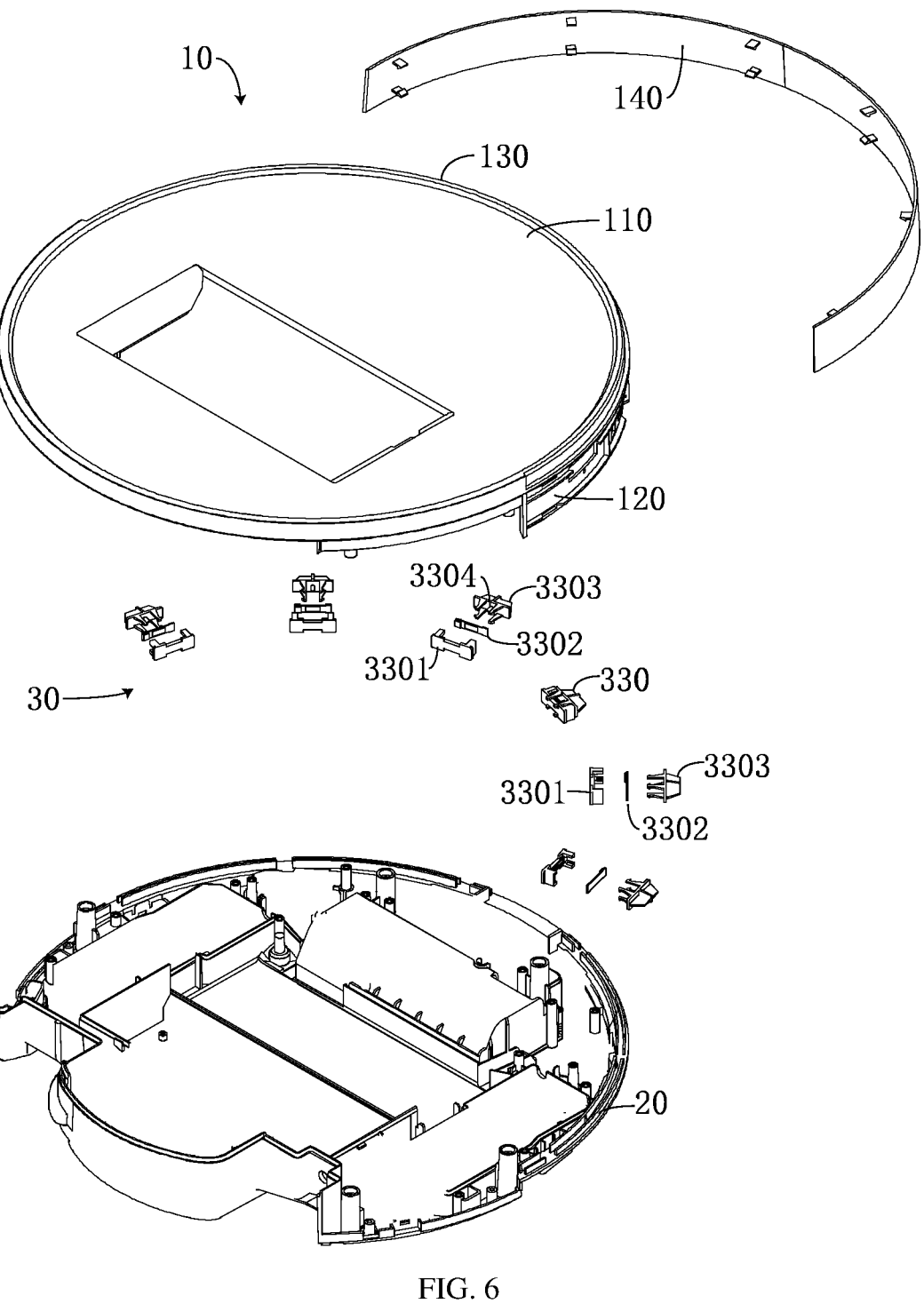
FIG. 6 is a schematic exploded diagram of another three-dimensional structure of an autonomous mobile robot provided in an embodiment of the present disclosure.
Figure 7:
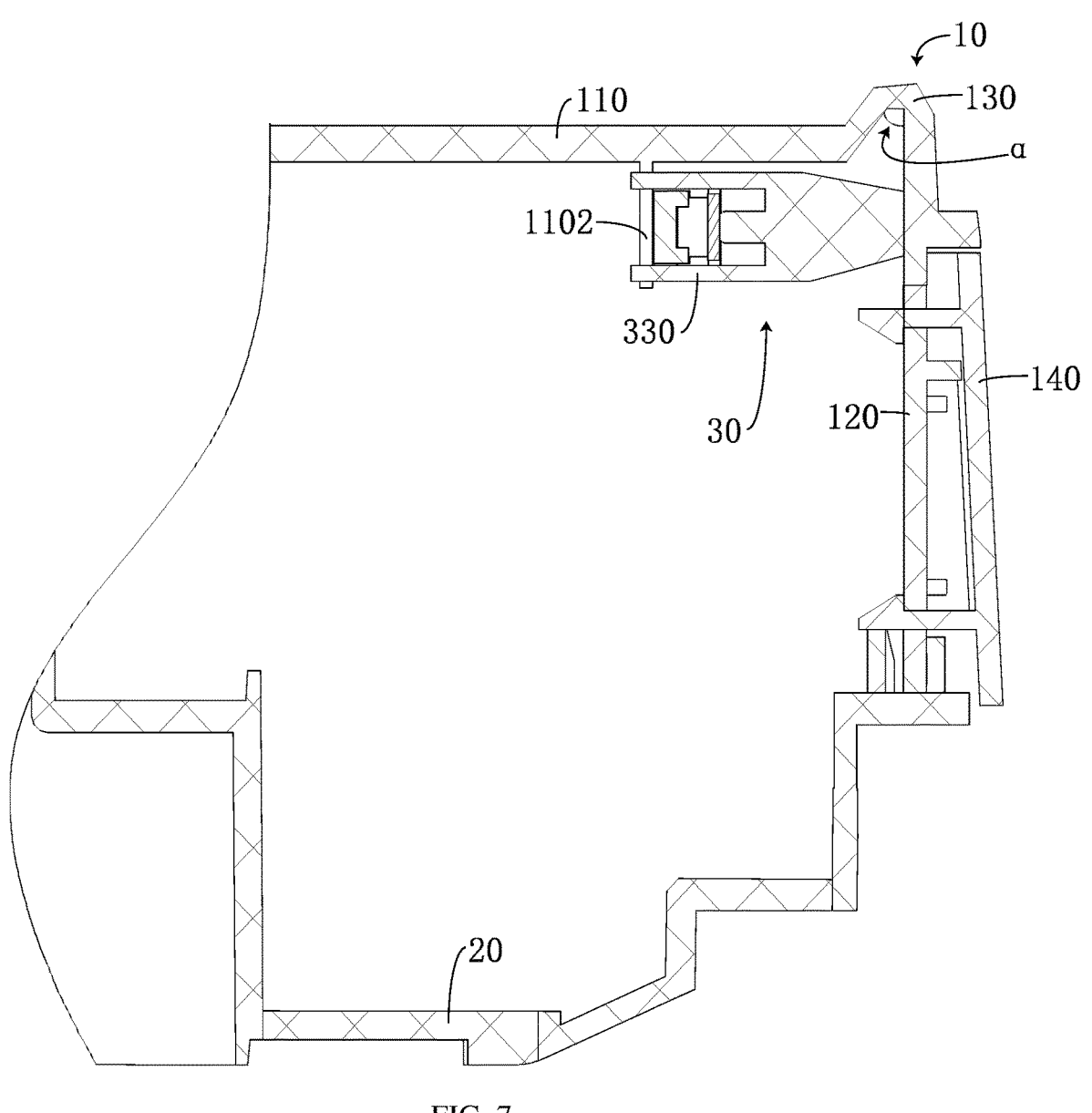
FIG. 7 is a schematic diagram of another partial structural section of an autonomous mobile robot provided in an embodiment of the present disclosure.
Figure 8:
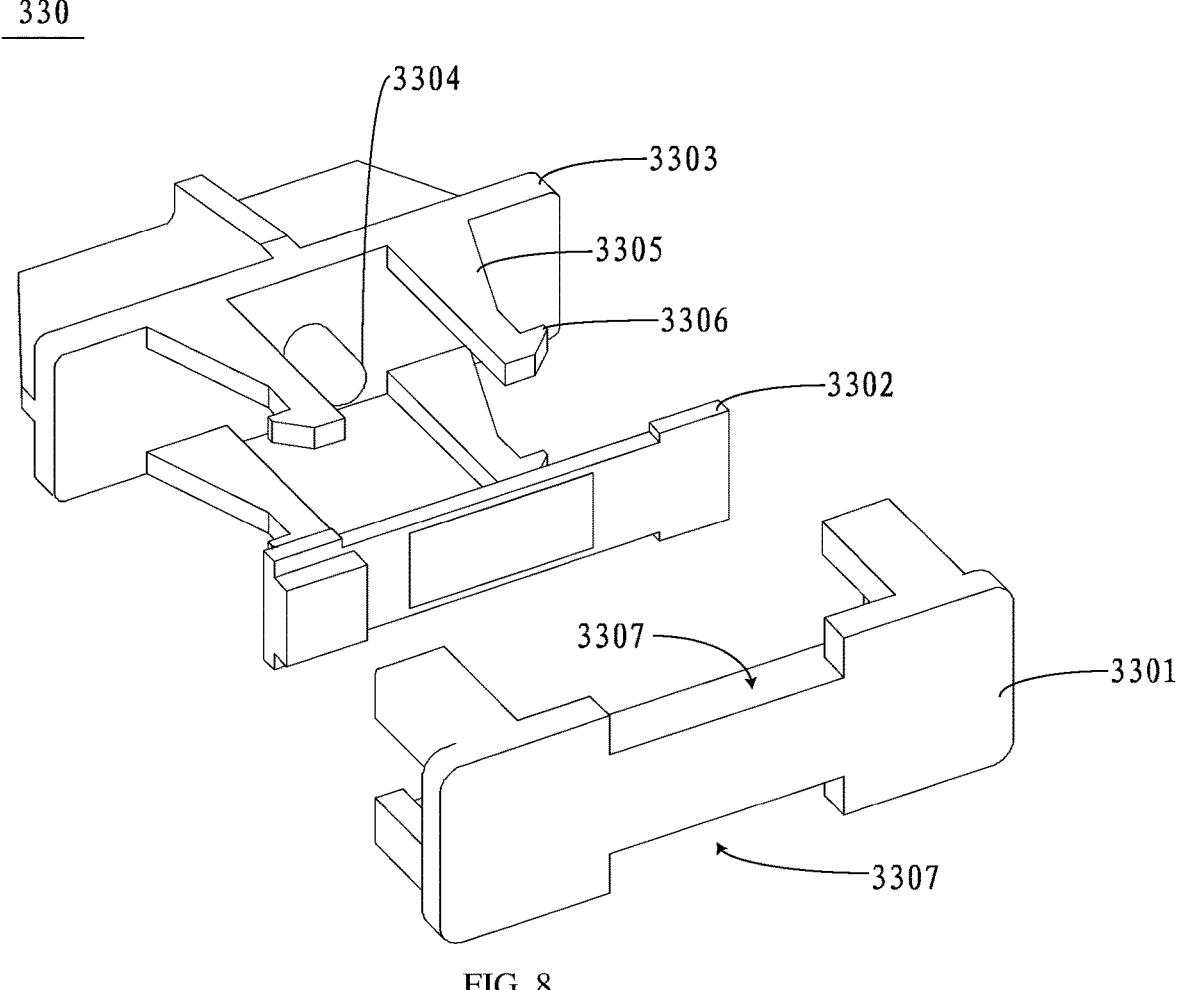
FIG. 8 is a schematic exploded diagram of a three-dimensional structure of a strain pressure sensor of an autonomous mobile robot provided in an embodiment of the present disclosure.

Referring to FIG. 6 to FIG. 8, in another embodiment of the present disclosure, the pressure sensor assembly 30 includes at least one strain pressure sensor 330; each of the strain pressure sensors 330 includes a sensor seat 3301 and a sensor body 3302; the sensor seat 3301 is disposed on the side of the top plate 110 facing the base 20; the sensor body 3302 is disposed on the sensor seat 3301; and the sensing surface of the sensor body 3302 faces the side plate 120.

The strain pressure sensor 330 is arranged on the top plate 110 of the cover 10, and its sensing surface faces the side plate 120 of the cover 10. Specifically, the sensor seat 3301 is fixedly connected to the top plate 110 and is used for providing a mounting base for the sensor body 3302.

According to the structure of the sensor body 3302, a layer of strain material is printed on a Printed Circuit Board (PCB) base plate. After the sensor body 3302 is subjected to a force, the strain material on the PCB base plate is driven to deform, and a voltage value output by the sensor body 3302 changes. The sensor body 3302 converts the changed voltage value into an ADC signal through an algorithm and sends the ADC signal to the host MCU of the autonomous mobile robot. The sensor body 3302 is fixedly connected to the sensor seat 3301 so that its sensing surface faces the side plate 120. When the side plate 120 has a movement towards the inside of the machine body, the sensor body 3302 is squeezed, which drives the strain material on its PCB base plate to deform, and the externally output voltage value changes, so that the changed voltage value is converted into the ADC signal through an algorithm and is transmitted to the host MCU of the autonomous mobile robot.

Further, each of the strain pressure sensors 330 further includes a sensor cover 3303; the sensor cover 3303 is connected to the sensor seat 3301 and moves relative to the sensor seat 3301; a side of the sensor cover 3303 facing away from the sensor seat 3301 faces the side plate 120; and a side of the sensor cover 3303 facing the sensor seat 3301 is provided with a first sensing protrusion 3304 opposite to the sensor body 3302.

Specifically, the sensor cover 3303 is connected to the sensor seat 3301; the sensor body 3302 is located between them; the sensor cover 3303 plays a role of protecting the sensor body; the sensor cover 3303 can move relative to the sensor seat 3301; a surface of the sensor cover facing the sensor body 3302 is provided with the first sensing protrusion 3304; when the sensor cover 3303 moves towards the sensor body 3302, the first sensing protrusion 3304 quickly contacts the sensor body 3302 and squeezes the sensor body 3302 to trigger the sensor body 3302 to complete sensing detection. Since the first sensing protrusion 3304 has a smaller sectional area, the sensing sensitivity of the sensor body 3302 can be improved.

Alternatively, a side of the side plate 120 facing the sensing surface of the sensor body 3302 is provided with a second sensing protrusion (not shown) opposite to the sensor body 3302. According to the implementation mode in the above embodiment, the sensor cover 3303 is provided between the strain pressure sensor 330 and the side plate, while in this embodiment, no sensor cover 3303 is provided. However, the second sensing protrusion is provided on the side of the side plate 120 facing the sensing surface of the sensor body 3302. The second sensing protrusion can play the same role as the first sensing protrusion 3304, that is, the sensing sensitivity of the sensor body 3302 can be improved.

Further, the sensor cover 3303 on both sides of the first sensing protrusion 3304 is provided with a connecting rod 3305 facing the sensor seat 3301; an end part of the connecting rod 3305 is provided with a hook 3306; and a position of the sensor seat 3301 opposite to the connecting rod 3306 is provided with a connecting slot 3307 for the connecting rod 3305 to pass through.

A specific structural form of the strain pressure sensor 330 is provided; two sides of the sensor seat 3301 are provided with the connecting slots 3307; two sides of the sensor cover 3303 are provided with the connecting rods 3305; the connecting rods 3305 are inserted into the connecting slots 3307; they are snapped movably through the hook 3306, and the connecting rods 3305 can move in the connecting slots 3307 towards the sensor body 3302 to ensure that when the sensor cover 3303 is squeezed by an external force, the first sensing protrusion 3304 contacts the sensor body 3302 to trigger the sensor body 3302 to complete the sensing detection.

In addition, the autonomous mobile robot further includes a second fixed frame 1102; the second fixed frame 1102 is arranged on a side of the top plate 110 facing the base 20; the sensor seat 3301 is arranged on a side of the second fixed frame 1102 facing the side plate 120; and a second preset distance is reserved between the sensor body 3302 and the side plate 120. The second fixed frame 1102 provides a mounting platform for the strain pressure sensor 330. Specifically, the sensor seat 3301 is arranged on the side of the second fixed frame 1102 facing the side plate 120. Specific connection methods include, but are not limited to, welding, snap connection, bonding and screw connection. For example, the second fixed frame 1102 and the sensor seat 3301 are integrally disposed. The second preset distance here refers to a distance between the sensor body 3302 and the side plate 120.

Further, the second preset distance is 15.5 mm to 17.5 mm. In a preferred embodiment, the second preset distance is 16.5 mm. By the second preset distance in the above numerical value, when the side plate 120 inwards squeezes the sensor body 3302, the sensor seat 3301 and the sensor body 3302 are deformed towards the inside of the machine body together with the side plate 120, so that a failure of the obstacle avoidance detection caused by the inability of deformation under a pressure of the sensor body 3302 can be avoided, thereby improving the reliability of the obstacle avoidance detection of the autonomous mobile robot.

In addition, the number of the strain pressure sensors 330 is not less than two, and the included angle between two adjacent strain pressure sensors 330 is not more than 45 degrees. Specifically, since the side plate 120 is generally arranged along the front half part in the forward movement direction of the autonomous mobile robot, in order to increase the obstacle avoidance detection range, two or more strain pressure sensors 330 are generally arranged along the lengthwise direction of the side plate 120. At the same time, in order to avoid a detection vacuum zone between two strain pressure sensors 330, which leads to a decrease in the reliability of the obstacle avoidance detection of the autonomous mobile robot, the included angle between the two strain pressure sensors 330 is generally set to be not more than 45 degrees, so as to ensure that contact between the obstacle and any position of the side plate 120 can be detected by the strain pressure sensors 330. The angle between two adjacent strain pressure sensors 330 can be understood as: auxiliary lines extending towards the two strain pressure sensors 330 respectively are made from the center of the autonomous mobile robot. The two auxiliary lines pass through the two strain pressure sensors, respectively. The included angle between the two auxiliary lines is an included angle between the two adjacent strain pressure sensors 330. Alternatively, each strain pressure sensor has an axis, and the included angle between two adjacent strain sensors is an included angle between the working axes of each strain sensor. The axis of the strain sensor can be understood as a straight line extending along the direction in which the strain sensor can be triggered. More specifically, referring to FIG. 8, the axis may be the axis of the first sensing protrusion 3304.

Much further, when the pressure sensor assembly 30 includes a plurality of the strain pressure sensors 330, and the plurality of the strain pressure sensors 330 are arranged along a peripheral direction of the side plate 120.

Specifically, since the side plate 120 generally surrounds half of circle of the outer contour of the autonomous mobile robot, that is, the length of the side plate 120 is generally large, and the sensing range of a single strain pressure sensor 330 is limited. Therefore, in a preferred embodiment, a plurality of the strain pressure sensors 330 are generally arranged in the cover 10 to ensure that the pressure sensor assembly 30 performs the obstacle detection in all directions of the autonomous mobile robot object detection to improve the obstacle avoidance integrity of the autonomous mobile robot. According to a specific method, a plurality of the strain pressure sensors 330 are arranged along the peripheral direction of the side plate 120. They may be arranged in equal intervals along the lengthwise direction of the side plate 120. According to the movement characteristics of the autonomous mobile robot, for example, the front end of the forward movement direction may encounter an obstacle, and the probability that two sides of the forward movement direction encounter obstacles is smaller. The plurality of the strain pressure sensors 330 can be arranged on the side plate 120 at the front end of the forward movement direction of the autonomous mobile robot, and the number of the strain pressure sensors 330 on the side plate 120 on the two sides of the forward movement direction of the autonomous mobile robot is decreased to a suitable extent. In one embodiment of the present disclosure, the number of the strain pressure sensors 330 is not less than 5.

The present disclosure further provides an autonomous mobile robot. The autonomous mobile robot includes a cover, a base and a pressure sensor assembly; the cover includes a top plate and a side plate that are integrally arranged; a connecting portion is formed between the top plate and the side plate, and the connecting portion is at least partially higher than the top plate; the base is arranged below the top plate; the pressure sensor assembly is arranged in a manner of facing the side plate; and a preset distance between a fixed frame of the pressure sensor assembly and the side plate is greater than 5 mm. In this embodiment, by setting the preset distance between the fixed frame of the pressure sensor assembly and the side plate to be greater than 5 mm, a failure of the obstacle avoidance detection caused by inability of deformation under a pressure of the pressure sensor assembly since the fixed frame of the pressure sensor assembly is deformed towards the internal direction of the machine body together with the pressure sensor assembly that is squeezed to be deformed when encountering an obstacle can be avoided, and the reliability of the obstacle avoidance detection of the autonomous mobile robot can be improved in sequence.

The present disclosure further provides an autonomous mobile robot, including a housing and a pressure sensor assembly; the housing includes a base plate and a side plate that are integrally arranged, and a connecting portion is formed between the base plate and the side plate; an angle formed by the connecting portion an acute angle; and a sensing surface of the pressure sensor assembly faces the side plate. In this embodiment, when the autonomous mobile robot encounters a hanging obstacle with a high height (for example, the bottom of a sofa) or a short obstacle with a low height (for example, a balcony sliding door navigator) during its movement contacts connecting portion, the connecting portion is squeezed towards the inside of the machine body. In the squeezing process, due to the acute angle structure of the connecting portion between the base plate and the side plate, the side plate can be ensured to have a movement toward the inside of the machine body in a horizontal direction of the movement of the machine, that is, the side plate may be deformed towards the inside of the machine body, then contact the pressure sensor assembly and make it deformed, so that the pressure sensor assembly generates a squeeze deformation signal, so as to complete the obstacle avoidance detection of the autonomous mobile robot. During specific implementation, the base plate may be a top plate or a base or the like.

The connecting portion provided in an acute angle is further more favorable for the side plate to move toward the inside of the machine body. In other preferred embodiments of the present disclosure, the value of the acute angle is less than 30 degrees.

Application Scenarios

A sweeping robot Xiaoke intends to clean the living room of an owner. According to a preset cleaning route, Xiaoke is blocked by a building block of a child in the host family. This building block acts as an obstacle and has a small thickness. Its top height is lower than that of Xiaoke. At this time, a front side plate of Xiaoke collides with the building block, and the side plate is then deformed toward the inside of the machine body of Xiaoke. The pressure sensor assembly arranged on the top plate of the machine body and opposite to the side plate may be squeezed by the side plate that is deformed towards the inside of the machine body and be deformed, so that the pressure sensor generates a corresponding impact signal and transmits the impact signal to the host MCU of Xiaoke; the host MCU generates a corresponding obstacle avoidance operation instruction to control the moving device of Xiaoke to execute the obstacle avoidance operation instruction and move, so as to complete obstacle avoidance; Xiaoke continues to sweep the living room of the owner according to the previous sweeping route after the obstacle avoidance; in the sweeping process, Xiaoke encounters the sofa of the owner; since there is a certain space below the sofa, this space is not big enough to allow Xiaoke to freely pass; the side plate in the front of Xiaoke will not undergo collision in the space below the sofa, but the top of Xiaoke will collide with the lower edge of the sofa, that is, the connecting portion between the side plate and the top plate at the front part of the forward movement direction of Xiaoke. This is because this connecting portion is partially higher than the top plate of Xiaoke, and the relative internal angle of the connecting portion is an acute angle. In case of collision, this connecting portion will deform in an opposite direction. Due to an angular relationship of the acute angle between the side plate and the top plate, the side plate may have a component of the movement towards the inside of the machine body, and at this time, the side plate may be deformed towards the inside of the machine body of Xiaoke. The pressure sensor assembly may be squeezed to deform by the side plate that is deformed towards the inside of the machine body, so that the pressure sensor generates a corresponding impact signal and transmits the impact signal to the host MCU of Xiaoke. The host MCU generates a corresponding obstacle avoidance operation instruction according to the impact signal, so as to control the moving device of Xiaoke to execute the obstacle avoidance operation instruction and move to complete the obstacle avoidance. Xiaoke will possibly encounter obstacles all the time in the sweeping process. By the above structure and method, the obstacle avoidance can be successfully completed, and sweeping routes are re-planned, so that Xiaoke finishes sweeping the living room of the owner according to the new sweeping routes.

It should be finally noted that: the above embodiments are only used to describe the technical solutions of the present disclosure, and not intended to limit the present disclosure.

Although the present disclosure has been described in detail with reference to the foregoing embodiments, those ordinarily skilled in the art should understand that they can still modify the technical solutions described in all the foregoing embodiments, or equivalently replace some of the technical features, and these modifications or replacements do not depart the essences of the corresponding technical solutions from the spirit and scope of the technical solutions of all the embodiments of the present disclosure.

What is claimed is:

1. An autonomous mobile robot, comprising: a cover, a base, and a pressure sensor assembly; wherein, the cover comprises a top plate and a side plate, the top plate and the side plate are integrally arranged, a connecting portion is formed between the top plate and the side plate, and the connecting portion is at least partially higher than the top plate; wherein the connecting portion comprises a first surface and a second surface, the first surface is connected to the top plate, and the second surface is connected to the side plate, there is an included angle between the first surface and the second surface;

the base is arranged below the top plate; and the pressure sensor assembly is arranged between the top plate and the side plate and a sensing surface of the pressure sensor assembly faces the side plate;

wherein the pressure sensor assembly comprises at least one strain pressure sensor;

each of the at least one strain pressure sensor comprises a sensor seat and a sensor body; the sensor seat is arranged on a side of the top plate facing the base; the sensor body is arranged on the sensor seat; and a sensing surface of the sensor body faces the side plate;

wherein each of the at least one strain pressure sensor further comprises a sensor cover; the sensor cover is connected to the sensor seat and moves relative to the sensor seat; a side of the sensor cover facing away from the sensor seat faces the side plate; and a side of the sensor cover facing the sensor seat is provided with a first sensing protrusion opposite to the sensor body.

2. The autonomous mobile robot according to claim 1, wherein the included angle is in an inverted V-shaped structure.

3. The autonomous mobile robot according to claim 1, wherein the side plate is made of rigid plastic.

4. The autonomous mobile robot according to claim 1, wherein a first gap is reserved between an end part of the side plate close to the base and an outer edge of the base.

5. The autonomous mobile robot according to claim 1, wherein the base is provided with a groove, a lower end of the side plate is inserted into the groove, and a second gap is reserved between an inner wall of the groove and the lower end of the side plate.

6. The autonomous mobile robot according to claim 1, wherein a thickness of the connecting portion is 1 mm to 2 mm.

7. The autonomous mobile robot according to claim 1, wherein a thickness of the side plate is 1 mm to 2 mm.

8. The autonomous mobile robot according to claim 1, wherein the pressure sensor assembly comprises a sensor support layer and a sensor body layer being attached to each other.

9. The autonomous mobile robot according to claim 8, further comprising: a first fixed frame; wherein, the first fixed frame is arranged on the top plate; the pressure sensor assembly is arranged between the side plate and the first fixed frame; an end part of the first fixed frame close to the side plate abuts against the sensor support layer; and the end part of the first fixed frame away from the side plate has a first preset distance from the side plate.

10. The autonomous mobile robot according to claim 9, wherein a minimum value of the first preset distance is 5 mm.

11. The autonomous mobile robot according to claim 10, wherein the first preset distance is 14 mm to 17 mm.

12. The autonomous mobile robot according to claim 1, wherein a number of the at least one strain pressure sensor is not less than two; and an included angle between two adjacent strain pressure sensors is not more than 45 degrees.

13. The autonomous mobile robot according to claim 1, further comprising: a second fixed frame; wherein, the second fixed frame is arranged on a side of the top plate facing the base; the sensor seat is arranged on a side of the second fixed frame facing the side plate; and the sensor body has a second preset distance from the side plate.

14. The autonomous mobile robot according to claim 13, wherein the second preset distance is 15.5 mm to 17.5 mm.

15. The autonomous mobile robot according to claim 1, wherein the sensor cover on both sides of the first sensing protrusion is provided with a connecting rod facing the sensor seat; an end part of the connecting rod is provided with a hook; and a position of the sensor seat opposite to the connecting rod is provided with a connecting slot for the connecting rod to pass through.

16. The autonomous mobile robot according to claim 1, wherein the pressure sensor assembly is fixed on the top plate.

17. The autonomous mobile robot according to claim 1, wherein a sensing surface of the pressure sensor assembly is located below the connecting portion.

18. An autonomous mobile robot, comprising: a cover, a base, and a pressure sensor assembly; wherein, the cover comprises a top plate and a side plate, the top plate and the side plate are integrally arranged, a connecting portion is formed between the top plate and the side plate, and the connecting portion is at least partially higher than the top plate; wherein the connecting portion comprises a first surface and a second surface, the first surface is connected to the top plate, and the second surface is connected to the side plate, there is an included angle between the first surface and the second surface;

the base is arranged below the top plate; and the pressure sensor assembly is arranged between the top plate and the side plate and a sensing surface of the pressure sensor assembly faces the side plate, and a preset distance between a fixed frame of the pressure sensor assembly and the side plate is greater than 5 mm;

wherein the pressure sensor assembly comprises at least one strain pressure sensor;

each of the at least one strain pressure sensor comprises a sensor seat and a sensor body; the sensor seat is arranged on a side of the top plate facing the base; the sensor body is arranged on the sensor seat; and a sensing surface of the sensor body faces the side plate;

wherein each of the at least one strain pressure sensor further comprises a sensor cover; the sensor cover is connected to the sensor seat and moves relative to the sensor seat; a side of the sensor cover facing away from the sensor seat faces the side plate; and a side of the sensor cover facing the sensor seat is provided with a first sensing protrusion opposite to the sensor body.

19. An autonomous mobile robot, comprising: a housing and a pressure sensor assembly; wherein, the housing comprises a base plate and a side plate, the base plate and the side plate are integrally arranged, a connecting portion is formed between the base plate and the side plate, the connecting portion comprises a first surface and a second surface, the first surface is connected to the base plate, and the second surface is connected to the side plate, there is an included angle between the first surface and the second surface; and the included angle is an acute angle; and the pressure sensor assembly is arranged between the top plate and the side plate and a sensing surface of the pressure sensor assembly faces the side plate.

* * * * *